Patented May 14, 1929.

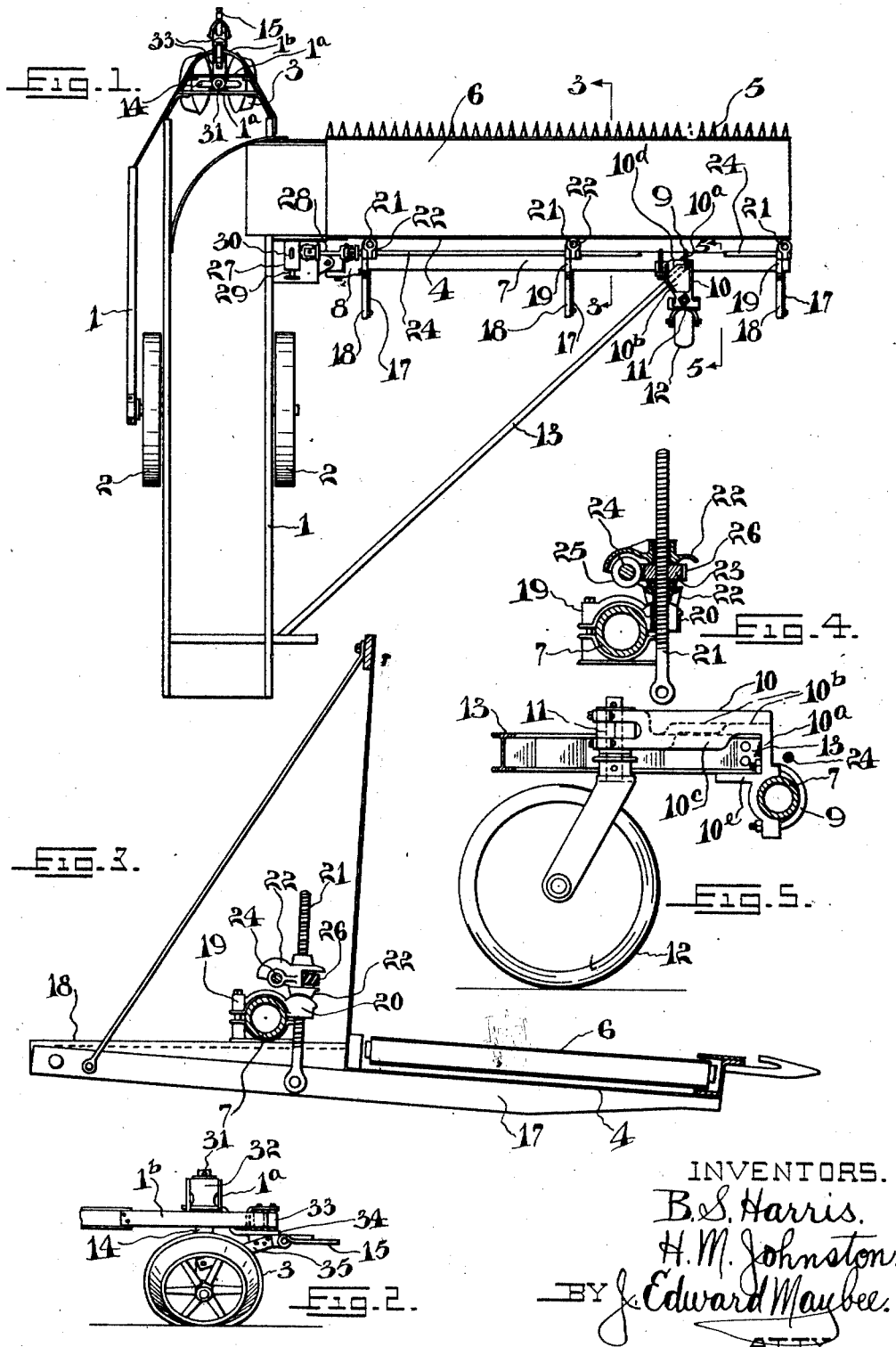

1,712,821

UNITED STATES PATENT OFFICE.

BURTON S. HARRIS AND HOWARD M. JOHNSTON, OF TORONTO, ONTARIO, CANADA, ASSIGNORS TO MASSEY-HARRIS COMPANY, LIMITED, OF TORONTO, CANADA.

REAPER THRASHER.

Application filed March 17, 1927. Serial No. 176,200.

This invention relates to implements adapted to cut grain and thrash it in the field, which employ cutting means, conveying means, and thrashing means driven usually by an internal combustion engine carried by the machine. The cutter bar and header platform are provided with means for vertical adjustment, and one object we have in view is to provide power operable means for effecting the adjustment which will not prevent the automatic lifting of the cutter bar in the event of it encountering obstacles on the ground tending to lift it. The outer end of the header platform is braced from the main frame by means of a diagonal brace and is supported by means of a caster wheel. A further object is to provide common means for connecting the brace with the header platform and for carrying the wheel.

We attain our objects by means of the constructions which may be briefly described as follows. From the forward part of the frame of the apparatus and close behind the header platform extends a bar having a universal joint connection with the frame. To this bar are secured rearwardly extending fulcrum members to the rear ends of which are pivoted forwardly extending supporting members carrying the header platform. To each supporting member is pivoted a supporting rod. The aforesaid bar carries means actuable by a common shaft for raising or lowering the said rods, which means is adapted to permit of the independent lifting of each rod. The outer end of the bar is braced from the main frame by a diagonal brace beam. The beam is connected with the bar by means of a bracket which is supported by a caster wheel.

The invention is hereinafter more specifically described and is illustrated in the accompanying drawings in which Fig. 1 is a plan view of part of a thrasher-harvester constructed in accordance with our invention;

Fig. 2 a detail in side elevation of the fore-carriage and its connections with the harvester;

Fig. 3 a cross section on the line 3—3 in Fig. 1 on an enlarged scale;

Fig. 4 a sectional detail of one of the raising and lowering units of the header platform.

Fig. 5 a sectional detail on the line 5—5 in Fig. 1.

In the drawings like numerals of reference indicate corresponding parts in the different figures.

1 is part of the main frame of a machine, which is supported by the ground wheels 2. This frame supports various parts of the machine (not herein referred to or described as they form no part of the present invention). In the forward end of the frame is mounted a fore-carriage 14, which is provided with a pair of ground wheels 3. The journal 31 of the fore-carriage is mounted in a bearing 32 carried by transverse members $1^a$ of the frame 1. These members are suitably secured to a member $1^b$ which forms a connection for the forward ends of the side members 1 of the frame. The portion of the member $1^b$ lying in front of the forward transverse member $1^a$ is curved concentric to the journal 31. Rollers 33 carried on a forward extension 34 of the fore-carriage are adapted to engage the inner and outer surfaces of the curved portion of the member $1^b$ to relieve the journal 31 of any bending stresses. A draft connection 15 is pivotally connected with the forward end of the extension 34. Braces 35 connected with the extension 34 behind the draft connection therewith are connected with the axle of the fore-carriage. Extending laterally from the forward part of the frame 1 is the header platform 4, which carries the cutter bar 5 and conveyor 6, which are of ordinary type, operated in any ordinary manner.

The header platform is carried in the following manner. A supporting bar 7 is connected with the main frame by a universal joint 8, and extends laterally behind the header platform. Adjacent the outer end of this supporting bar is connected, by means of U bolts 9, a bracket 10 in which the journal 11 of a caster wheel 12 is mounted.

The header platform is supported, as will hereinafter appear, solely from the supporting bar 7, and as the latter has a universal joint connection with the main frame, some form of brace must be employed to hold the header platform in working position. For this purpose we provide the diagonal brace 13. This, at its rear end, is connected in any suitable manner with the frame 1. The forward end of the brace, which is preferably an I beam, is bolted to the bracket 10 with its end in engagement with a wall $10^a$ formed on the bracket. The rearwardly extending part 10ᵇ of the bracket is adapted to engage the upper side of the I beam and this part is provided with a downwardly extending lip 10ᶜ which engages one side of the upper flange of the beam. The other side of this flange is engaged by a portion 10ᵈ of the wall 10ᵃ, and the bottom of the beam engages a lug 10ᵉ formed on the wall 10ᵃ. The forward end of the diagonal I beam 13 is thus carried in a pocket formed by the parts 10ᵃ, 10ᵇ, 10ᶜ, 10ᵈ and 10ᵉ which engage the forward end, top, sides and bottom of the beam to take all the thrust and to overcome any tendency of the bracket to rotate on the bar 7.

The header platform is provided with rearwardly extending supporting members 17, the rear ends of which are pivotally connected with the rearward ends of the fulcrum members 18, which are secured to the supporting bar 7 by means of the clamps 19. Each clamp 19 is provided with a saddle 20 through which freely passes the supporting rod 21 pivotally connected at its lower end to the adjacent supporting member 17. These supporting rods are threaded as shown. Each supporting rod passes through a bearing 22 in which is rotatably mounted a nut 23, through which the supporting rod is threaded. It is evident that by rotating the nuts 23 that the supporting members 17 may be moved up and down and the position of the header platform relative to the ground thus adjusted. In order that these nuts may be simultaneously operated, a shaft 24 is journaled in the bearings 22, and this shaft is provided with helical gears 25 meshing with helical gears 26 formed on the nuts 23.

It will be noted as the bearings 22 rest on the saddles 20 and are in no wise secured thereto that any upward movement of the header platform, such as may occur when it strikes an obstruction, will cause the bearings 22 to be lifted from the saddles. We have thus provided means whereby the header platform may automatically lift independent of the adjustment of the nuts 23.

In view of the fact that the shaft 24 must be operated from the main frame, provision must be made to permit of the rise and fall of the shaft. To drive the shaft we therefore provide a gear box 27 on the main frame. The shaft is driven from this gear box through the medium of the universal jointed telescopic shaft 28 of known type. The drive shaft 29 of the gear box may be actuated in any convenient manner from the power plant of the machine. The gear box includes reverse gear mechanism operable through the medium of a hand lever 30. The specific constructions of the reverse gears being immaterial, such constructions are not shown.

What we claim is:

1. In a harvester, the combination of a main frame; a header platform extending laterally therefrom; a header platform supporting bar connected with the main frame by a universal joint and extending behind the header platform; a ground wheel for supporting the outer end of the bar; fulcrum members secured to and extending rearwardly from the bar; forwardly extending header platform supporting members pivoted to the rear ends of the fulcrum members; a supporting rod pivotally connected to each supporting member; a shaft having bearings supported on the bar; and means actuable by the shaft for raising and lowering the supporting rods, said means being adapted to permit of the independent lifting of the supporting rods.

2. In a harvester, the combination of a main frame; a header platform extending laterally therefrom; a header platform supporting bar connected with the main frame by a universal joint and extending behind the header platform; a ground wheel for supporting the outer end of the bar; fulcrum members secured to and extending rearwardly from the bar; forwardly extending header platform supporting members pivoted to the rear ends of the fulcrum members; a supporting rod pivotally connected to each supporting member; saddles secured to the bar, one for each supporting rod, through which the said rods freely pass; shaft bearings, one resting on each saddle; a shaft journalled in said bearings; and a nut rotatably mounted in each bearing and geared to the shaft.

3. In a harvester, the combination of a main frame; a header platform extending laterally therefrom; a header platform supporting bar connected with the main frame by a universal joint and extending behind the grain deck; a ground wheel for supporting the outer end of the bar; fulcrum members secured to and extending rearwardly from the bar; forwardly extending header platform supporting members pivoted to the rear ends of the fulcrum members; raising and lowering units, one for each supporting member, carried by the bar; and a shaft carried by the bar for simultaneously operating all the units.

4. In a harvester, the combination of a main frame; a header platform extending laterally therefrom; a header platform supporting bar connected with the main frame by a universal joint and extending behind the header platform; a ground wheel for supporting the outer end of the bar; fulcrum members secured to and extending rearwardly from the bar; forwardly extending header platform supporting members pivoted to the rear ends of the fulcrum members; a supporting rod pivotally connected to each supporting member; a shaft having bearings supported on the bar; and means actuable by the shaft for raising and lowering the supporting rods, the raising and lowering mechanism being adapted to permit of the lifting of the supporting members independent of the operation of the shaft.

Signed at Toronto, Canada, this 4 day of March, 1927.

BURTON S. HARRIS.
HOWARD M. JOHNSTON.